United States Patent [19]
Marks et al.

[11] Patent Number: 5,520,476
[45] Date of Patent: May 28, 1996

[54] TIE-DOWN AND RELEASE MECHANISM FOR SPACECRAFT

[75] Inventors: Goeffrey W. Marks; Grant L. Young, both of Carpinteria, Calif.

[73] Assignee: Astro Aerospace Corporation, Carpinteria, Calif.

[21] Appl. No.: 79,302

[22] Filed: Jun. 18, 1993

[51] Int. Cl.$^6$ .................................. F16B 1/04; B64G 1/64
[52] U.S. Cl. .................... 403/322; 403/315; 244/161
[58] Field of Search ........................ 403/322, 324, 403/315, 316; 244/161, 137.4; 294/86.4, 93, 82.26, 82.24; 285/920, 86, 85, 81, 310

[56] References Cited

U.S. PATENT DOCUMENTS

| | | | |
|---|---|---|---|
| 3,526,372 | 9/1970 | Paine | 244/161 X |
| 4,132,147 | 1/1979 | Contaldo | 244/137.4 X |
| 4,138,148 | 2/1979 | Zaremba . | |
| 4,257,639 | 3/1981 | Stock | 244/137.4 X |
| 4,364,587 | 12/1982 | Samford | 285/85 X |
| 4,400,112 | 8/1983 | Castel et al. . | |
| 4,562,979 | 1/1986 | Taylor . | |
| 4,740,122 | 4/1988 | Glaser | 403/316 X |
| 4,833,760 | 5/1989 | Sundstrom | 403/322 X |
| 4,960,344 | 10/1990 | Geisthoff et al. . | |
| 5,082,390 | 1/1992 | Balsells . | |
| 5,098,042 | 3/1992 | Viale . | |

FOREIGN PATENT DOCUMENTS 226498  9/1989  Japan ............................ 244/161

*Primary Examiner*—Anthony Knight
*Attorney, Agent, or Firm*—Loeb and Loeb

[57] ABSTRACT

A release mechanism for attaching and releasing appendages from a main body such that shock and frictional effects are minimized. The release mechanism comprises a housing, a main cylindrical body, a collet, a toroidal spring and actuators, where the main cylindrical body includes radial projections. A wrap spring couples the collet and the toroidal spring.

21 Claims, 3 Drawing Sheets

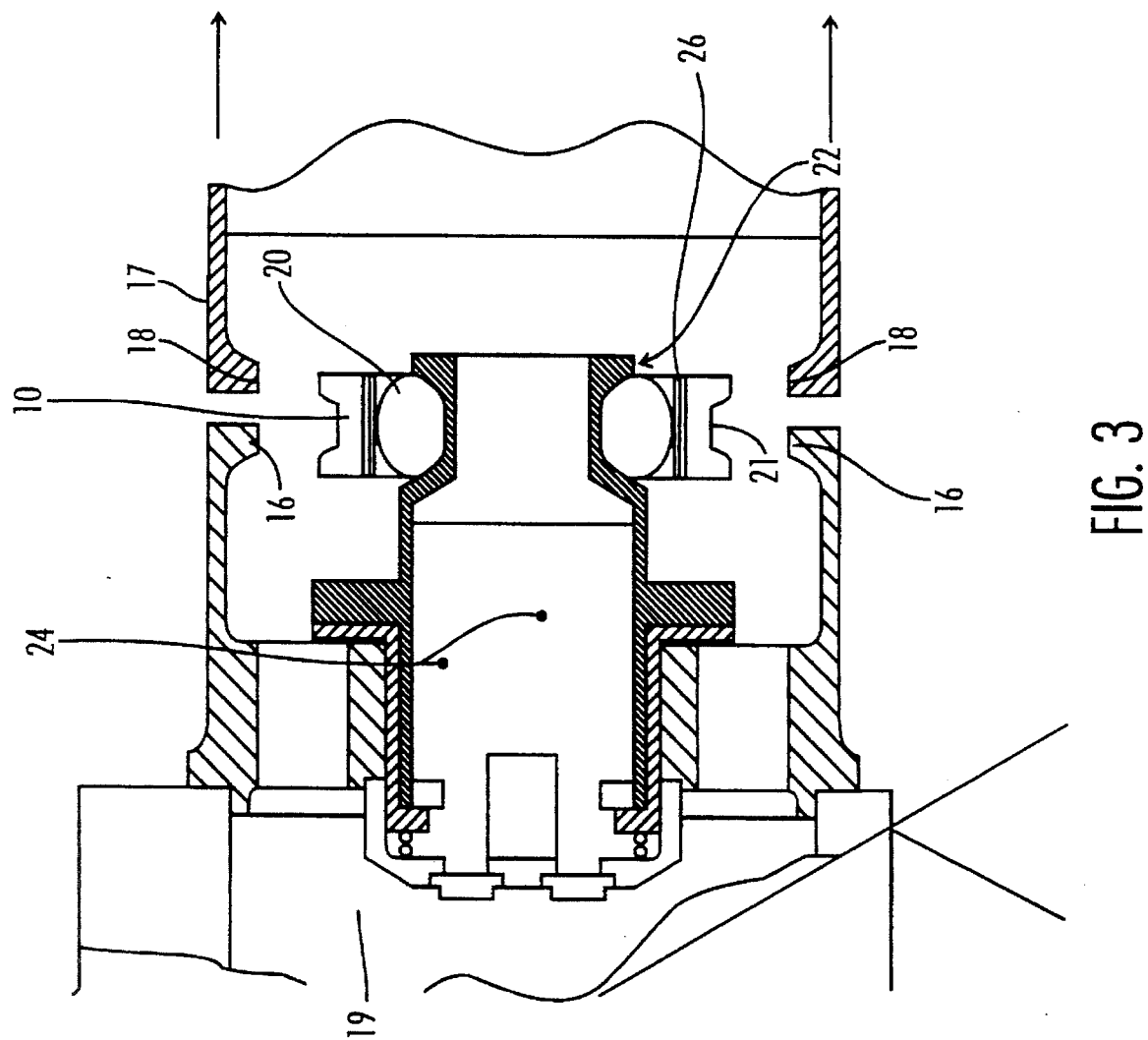

TIE-DOWN AND RELEASE MECHANISM FOR SPACECRAFT

FIELD OF THE INVENTION

This invention relates to a mechanism for attaching and deploying deployable appendages to and from a structural body, for example, a spacecraft and, in a particular embodiment, to a low release-shock mechanism that minimizes shock and frictional effects between an appendage and a spacecraft upon release of the appendage from the spacecraft.

BACKGROUND OF THE INVENTION

Release mechanisms are generally utilized to separate bodies or detach appendages from a main body. Separating two bodies presents the possibility that frictional effects or shock that may be transmitted between the bodies will, for example, affect the position, direction or speed of one or both of the bodies.

Various release mechanisms have been used in the past. For example, one such release mechanism is a device for latching and unlatching a riser pipe to the casing in a subsea well. The device is described U.S. Pat. No. 4,138,148 to Zaremba. In Zaremba, the releasing mechanism utilizes a number of radially extendible pistons to expand a split ring out of the casing groove in the subsea well to the grooved recess of the riser pipe. The casing is cemented in the wellbore and the riser pipe is attached to the casing.

Another release type mechanism is found in U.S. Pat. No. 4,400,112 to Castel. In Castel, the device connects and disconnects guidelines between installations on the seabed and a floating platform. In this device, a disconnecting device comes into contact with locking heads and applies an amount of force such that the locking heads are disengaged.

One other device is found in U.S. Pat. No. 5,098,042 to Viale. In Viale, the device maintains a set of elements in a folded position that are hinged to one another and to a structure, e.g., solar panels on a spacecraft. The device utilizes a control means that unlocks a locking means and allows the set of elements to pass from the folded position to an unfolded position. The control means comprises a cam-forming piece coaxial with the retaining member in which the retaining member is locked by balls positioned in spherical depressions of the retaining member. The retaining member is unlocked when the balls are moved out of the spherical depressions.

None of the aforementioned mechanisms attempt to minimize the frictional effects and the shock that is transmitted to separating bodies. Minimization of the frictional effects and the transmission of shock between separating bodies is important in the environment of space as it minimizes the possibility of altering, for example, a spacecraft's position.

SUMMARY OF THE DISCLOSURE

An object of an embodiment of the present invention is to provide a mechanism that minimizes the frictional and shock effects imparted to separating bodies. Embodiments of the present invention achieve this objective by providing a low release shock mechanism for attaching deployable appendages to spacecraft. The deployable appendages include, but are not limited to, solar panels, radar panels, antennas or fold-out booms.

An embodiment includes a collet that is preloaded outward by a toroidal spring. The collet grips internal flanges on separable structures that are attached to the spacecraft and the appendage.

The toroidal spring is expanded over a plunger and is designed to roll, rather than slide, into the annular groove in the plunger. The rolling of the toroidal spring into the annular groove of the plunger effectuates the release of the flange sections.

The embodiments further include a low force actuator. Dual or redundant actuators can also be used. The actuators withdraw the release plunger such that toroidal spring rolls between the plunger and a wrap spring that is located on the inside of the collet. When the toroidal spring rolls into the annular groove of the plunger, the collet collapses and releases the lip sections.

Thus, according to the illustrated embodiment, a toroidal spring capable of rolling, rather than sliding is used. This aspect allows for low loads on release.

BRIEF DESCRIPTION OF THE DRAWINGS

The detailed description of the embodiments of the invention will be made with reference to the accompanying drawings, wherein like numerals designate corresponding parts in the figures.

FIG. 3 is a lateral cross section of an embodiment of the invention in the collapsed state.

DETAILED DESCRIPTION OF THE PREFERRED EMBODIMENTS

Figure 1:
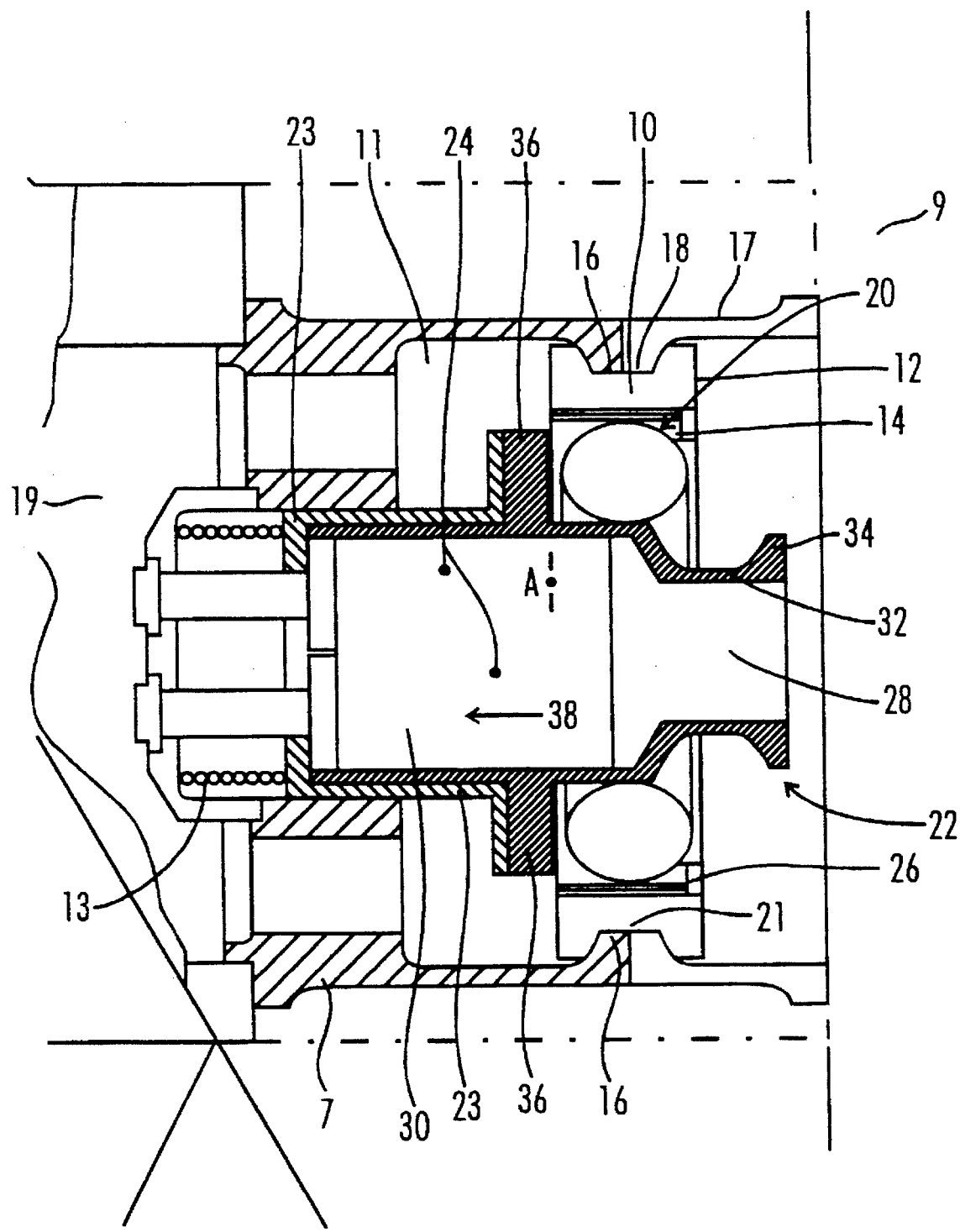
FIG. 1 is a lateral cross section of an embodiment of the invention in the expanded state.

FIG. 1 depicts a lateral cross section of a release mechanism according to an embodiment of the present invention. Generally, the release mechanism 9 shown in FIG. 1 comprises a housing 7 having a lip 16 and a hollow interior 11 containing a collet 10, a toroidal spring 20, a moveable cylindrical body 22, actuators 24 and a wrap spring 26. As discussed in more detail below, the release mechanism 9 is suitable for releasably securing (i.e., secured but able to be released) an appendage 17 (e.g., a satellite) to a main structure 19 (e.g., a spacecraft).

The housing 7 is generally cylindrical in shape and comprises a lip 16 that engages a lip 18 of the appendage, a base with a passage where the plunger and/or actuators are positioned and a generally hollow interior where a portion of the plunger, toroidal spring and collet are provided. Further, the housing 7 has bolt holes in the base to mount it to the spacecraft.

Figure 2:
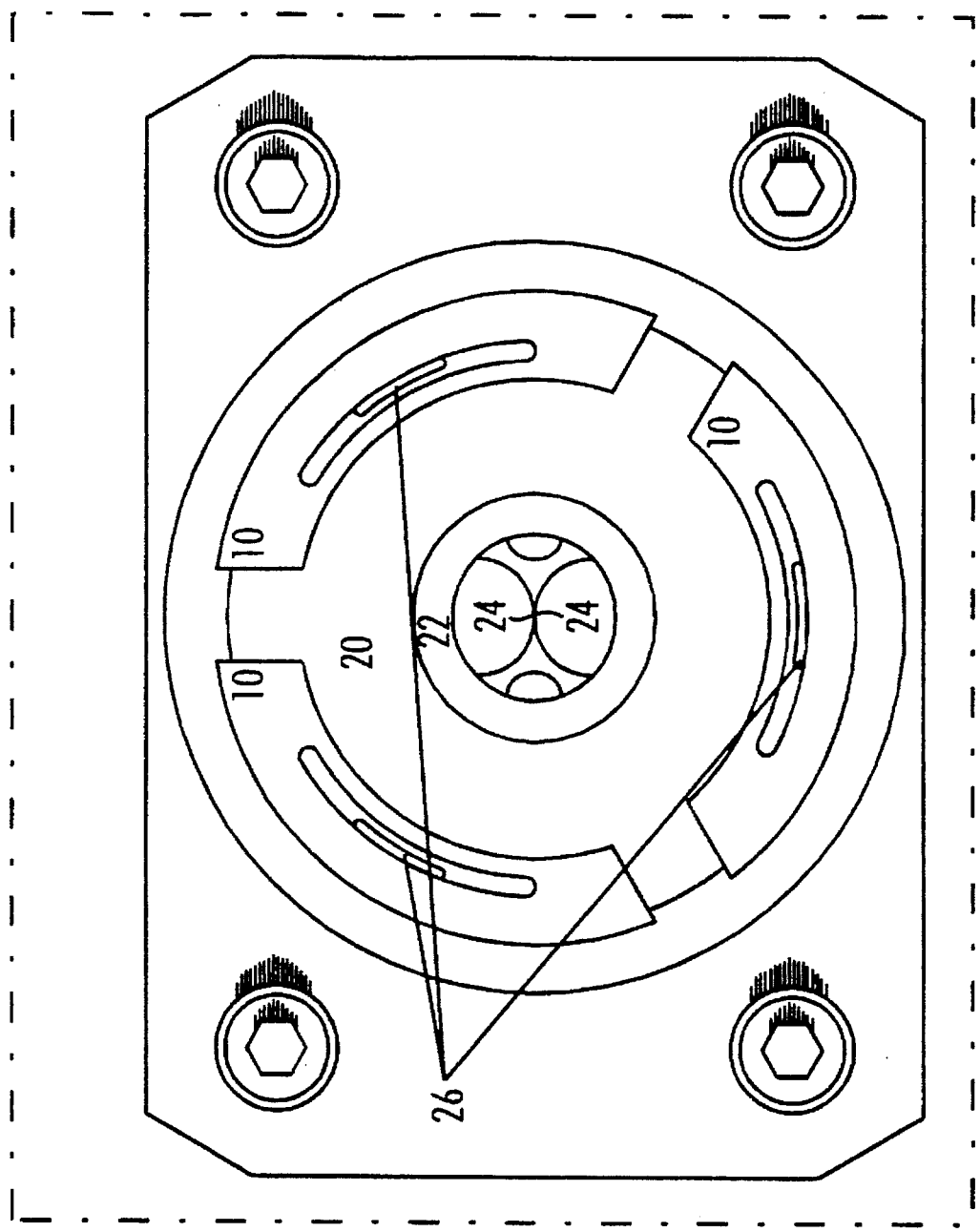
FIG. 2 is a top view of the FIG. 1 embodiment.

The collet 10 is a band like element, with an outer surface 12 and an inner surface 14. As depicted in FIG. 2, the collet 10 is generally a multipiece structure where each individual element of the collet 10 is arc-like. The multipiece structure depicted in FIG. 2 does not limit the collet 10 to a multipiece structure, but rather, in some embodiments (not shown) the collet 10 is a solid piece. The collet is preferably composed of rigid material, such as, but not limited to, metals and metal alloys. The collet comprises an annular groove 21 that is capable of receiving both lips 16, 18. The annular groove 21 is tapered on both sides such that each side matches the tapered edge of a lip. The lips 16, 18 fit within the annular groove 21 when the lips 16, 18 are abutted against each other. The collet 10 holds the lips 16, 18 together when the cylindrical body is in its attachment state as discussed below.

FIG. 1 depicts the collet 10 prior to collapsing where the collet 10 is in an expanded state such that it couples with lips 16, 18. The lip 18 is coupled to a separable body that is attached to a spacecraft.

A wrap spring 26 resides adjacent the inner surface 14 of the collet 10. The wrap spring 26 comprises a flat strip of metal or metal alloys, including but not limited to, copper or stainless steel, that is formed into a ring. The wrap spring 26 prevents the coils of the toroidal spring 20 from falling into the spacing between the separated pieces of the collet 10. Further, the wrap spring 26 assists collapsing the collet 10 by pulling it together.

The toroidal spring 20 resides adjacent the wrap spring 26 and the cylindrical body 22. The toroidal spring 20 may be composed of a compression spring that is formed into a toroidal shape. The toroidal spring 20 is arranged to roll from the position shown in FIG. 1 to the position shown in FIG. 3, rather than slide, to effectuate the collapse of the collet 10. The ability of the toroidal spring 20 to roll reduces the load on release.

The cylindrical body 22 comprises a first section 28 of varying diameter and a second section 30 of constant diameter. The first section 28 further defines an annular groove 32 and a lip 34. The second section 30 further comprises projections 36 extending radially outward from the outer peripheral surface of the second section 30. The cylindrical body 22 may be characterized as a release plunger which is moveable between an attachment state (as shown in FIG. 1), where the spring 20 is expanded about the large diameter of the second section 30, and a release state (as shown in FIG. 3), where the spring 20 has rolled into the annular groove 32. Further, as shown in FIG. 1, a spring 13 is positioned between the cylindrical body 22 and the main structure 19 to bias the cylindrical body 22 in the direction opposite the direction of the arrow 38.

The cross-sectional diameter of the annular groove 32 is generally smaller than the cross-sectional diameter of the second section 30. The cross-sectional diameter of the lip 34 is larger than the cross-sectional diameter of the annular groove 32. The annular groove 32 is large enough to seat the oval cross section of the toroidal spring 20 as shown in FIG. 3.

A circular flange or projection 36 protrudes radially from the second section 30 of the cylindrical body 22. Generally, the circular flange 36 protrudes a distance from the cylindrical body 22 sufficient to prevent the toroidal spring 20 from rolling beyond a fixed point, A (see FIG. 1), on the second section 30 of the cylindrical body 22. Alternative embodiments may have plural projections.

The actuators 24 comprise low force mechanisms capable of moving the cylindrical body 22 in the direction of arrow 38 in FIG. 1 to move the collet 10 and release the appendages. In a preferred embodiment, the actuator 24 is of a pyrotechnic device or paraffin device. Examples of such actuators are the Miniature Thruster, part number SF2109-1 produced by Hi-Shear Technology Corporation in Torrance and the IH-5055-J Actuator made by Starsys Research of Boulder, Colo. Other suitable actuators may be composed of, but not limited to, electrical solenoids. The actuators 24 are coupled by suitable electronics (not shown) to an operator control switch (not shown), such that an operator at a remote location (e.g., within the spacecraft, in another spacecraft or at a ground location) may operate the switch to selectively activate the actuators 24. In other embodiments, the actuators 24 may be activated in response to the passage of a predetermined amount of time or in response to sensed environmental conditions. A sleeve 23 adjacent the cylindrical body 22 holds the actuators in place.

FIG. 2 is a top view of the FIG. 1 embodiment depicting the relative positions of various components of the illustrated embodiment of the invention. FIG. 2 depicts an embodiment where the collet 10 is a multipiece band, as opposed to a single, contiguous band. Further, FIG. 2 depicts a system utilizing dual actuators 24.

FIG. 3 is a lateral cross section of an embodiment of the release mechanism depicting the collet 10 in a collapsed state. In FIG. 3, the lips 16 and 18 are disconnected from the collet 10, thus, the appendage that was attached to lip 18 is disconnected from the spacecraft. Further, the collet 10 and toroidal spring 20 have moved to the annular groove 32.

In an appendage release operation, the collet 10 is initially preloaded in an outward position by the toroidal spring 20 as shown in FIG. 1. On command from the spacecraft or other control station, including, but not limited to, ground control, a space station or another spacecraft, the low force actuator or actuators 24 are activated to move the cylindrical body 22 relative to the housing 7. As the cylindrical body 22 moves in the direction of the arrow 38 depicted in FIG. 1, the collet 10 is held in place relative to the housing 7 and the toroidal spring 20 rolls along the outer peripheral surface of the cylindrical body 22 towards the groove 32 in the first section 28. The coils of the toroidal spring 20 roll between the cylindrical body 22 and the wrap spring 26.

The wrap spring 26 prevents the coils of the toroidal spring 20 from jamming into the spaces between the collet 10 sections. The toroidal spring 20 is adapted to roll into the annular groove 32 of the first section 28 of the cylindrical body 22 as the cylindrical body 22 is moved in the direction of the arrow 38 in FIG. 1. The lip 34 inhibits the toroidal spring 20 from rolling beyond the 32. At or around the time that the toroidal spring 20 enters the annular groove 32, the collet 10 collapses because the spring 20 is no longer in its FIG. 1 position where it would support the collet 10 in an expanded state. As the collet 10 collapses, the housing lip 16 and the appendage lip 18 are disengaged from the collet groove 21 to release the appendage 18 from the spacecraft. Because the spring 20 rolls smoothly between the position shown in FIGS. 1 and 3, the separation of the bodies is accomplished with minimal friction and shock transmitted to the separating bodies.

Although the foregoing describes the invention with preferred embodiments, this is not intended to limit the invention. For example, while the foregoing describes embodiments of the invention applied to a spacecraft and an appendage, it will be understood that further embodiments of the invention may be employed for releasably coupling other types of structures together, such as, for example, railroad cars. Rather, the foregoing is intended to cover all modifications and alternative constructions falling within the spirit and scope of the invention as expressed in the appended claims.

What is claimed is:

1. A release mechanism for releasably securing an appendage having an appendage lip to a main structure, the release mechanism comprising:

a cylindrical body having an axis, the cylindrical body being secured to and supported for movement in the axial direction relative to the main structure;

a collet supported about the axis of the cylindrical body and moveable between an expanded state and collapsed state dependent upon the position of the cylindrical body relative to the main structure, the collet having a lip receptacle for engaging the appendage lip upon the collet being in the expanded state and for disengaging the lip upon the collet being in the collapsed state; and a toroidal compression spring between the collet and the cylindrical body.

2. A release mechanism of claim 1 where the cylindrical body has a relatively small diameter section and a relatively large diameter section, and where the compression spring is arranged to roll between the relatively large diameter portion and the relatively small diameter portion as the cylindrical body is moved relative to the main structure.

3. A release mechanism of claim 2 further comprising:

an actuator coupled to the main body for moving the body relative to the main structure.

4. A release mechanism of claim 3 further comprising:

a wrap spring coupled to the collet.

5. A release mechanism of claim 4 where main body defines a first section having a first diameter and a second section having a second diameter larger than the first diameter.

6. A release mechanism of claim 5 where the first section defines an annular groove for receiving the spring.

7. A release mechanism of claim 6 where the first section defines a lip for inhibiting movement of the spring upon the receipt of the spring in the annular groove.

8. A release mechanism of claim 7 further comprising:

projections coupled to the second section of the cylindrical body for abutting the spring upon the collet being in the expanded state.

9. A device for releasably engaging an appendage to a main body, the device comprising:

a moveable collet movably coupled to the main body and having an expanded diameter state and a contracted diameter state, the collet defining a surface arranged to engage the appendage upon the collet being in the expanded diameter state and to disengage the appendage when the collet is in the contracted diameter state; and a moveable toroidal spring having an expanded diameter state and a contracted diameter state, the toroidal spring supporting the collet in the collet's expanded diameter state when the toroidal spring is in an expanded diameter state and the toroidal spring supporting the collet in the collet's contracted diameter state when the toroidal spring is in a contracted diameter states.

10. A device of claim 9 further comprising a cylindrical body moveably secured to the main body, the cylindrical body being moveable between a first position where the collet and toroidal spring are in an expanded state and a second position where the collet and toroidal spring are in a collapsed state.

11. A method of releasably securing an appendage having a lip to a main structure comprising the steps of:

movably securing a cylindrical body to the main structure;

moving the cylindrical body relative to the main structure;

supporting a collet about the cylindrical body;

moving the collet between an expanded state and a collapsed state dependent upon the movement of cylindrical body relative to the main structure;

engaging the appendage lip with a lip receptacle in the collet upon the collet being in the expanded state; and disengaging the appendage lip from the lip receptacle in the collet upon the collet moving to the collapsed state; and wherein the step of moving the cylindrical body relative to the main structure comprises the step of moving the cylindrical body with an actuator; and wherein the step of supporting the collet about the cylindrical body comprises the step of providing a toroidal spring between the collet and the cylindrical body.

12. The method as in claim 11 wherein the step of supporting the collet about the cylindrical body further comprises the step of coupling a wrap spring to the collet.

13. The method as in claim 12 wherein the step of moving the collet between an expanded state and a collapsed state comprises the step of rolling the compression spring into the annular groove.

14. The method as in claim 13 wherein the step of engaging the appendage flange with a flange receptacle comprises the step of rolling the compression spring between the relatively small diameter portion of the cylindrical body and the relatively large diameter portion of the cylindrical body.

15. The method as in claim 14 wherein the step of disengaging the flange comprises the step of rolling the compression spring between a relatively large diameter portion of the cylindrical body and the relatively small diameter portion of the cylindrical body.

16. A release mechanism for releasably securing an appendage having an appendage lip to a main structure, the release mechanism comprising:

a cylindrical body having an axis, the cylindrical body being secured to and supported for movement in the axial direction relative to the main structure;

a collet supported about the axis of the cylindrical body and moveable between an expanded state and collapsed state dependent upon the position of the cylindrical body relative to the main structure, the collet having a lip receptacle for engaging the appendage lip upon the collet being in the expanded state and for disengaging the lip upon the collet being in the collapsed state; and a toroidal compression spring between the collet and the cylindrical body; and the spring movable between an expanded state and a contracted state dependent upon the position of the cylindrical body relative to the main structure for moving the collet between its expanded and contracted states.

17. A device for releasably engaging an appendage to a main body, the device comprising:

a moveable collet movably coupled to the main body and having an expanded diameter state and a contracted diameter state, the collet defining a surface arranged to engage the appendage upon the collet being in the expanded diameter state and to disengage the appendage when the collet is in the contracted diameter state; and a moveable resilient member having an expanded diameter state and a contracted diameter state, the resilient member supporting the collet in the collet's expanded diameter state when the resilient member is in an expanded diameter state and the resilient member supporting the collet in the collet's contracted diameter state when the resilient member is in a contracted diameter state.

18. A method of releasably securing an appendage having a lip to a main structure comprising the steps of:

movably securing a cylindrical body to the main structure;

moving the cylindrical body relative to the main structure;

supporting a collet about the cylindrical body, wherein supporting the collet about the cylindrical body comprises the step of providing an elastic member between the collet and the cylindrical body;

moving the collet between an expanded state and a collapsed state dependent upon the movement of cylindrical body relative to the main structure;

engaging the appendage lip with a lip receptacle in the collet upon the collet being in the expanded state; and disengaging the appendage lip from the lip receptacle in the collet upon the moving to the collapsed state.

19. The method as in claim 18 wherein the step of moving the cylindrical body relative to the main structure comprises the step of moving the main body with an actuator.

20. A release mechanism for releasably securing an appendage having an appendage lip to a main structure, the release mechanism comprising:

a cylindrical body secured to and supported for movement relative to the main structure;

a collet supported about the cylindrical body and moveable between an expanded state and collapsed state dependent upon the position of the cylindrical body relative to the main structure, the collet having a lip receptacle for engaging the appendage lip upon the collet being in the expanded state and for disengaging the lip upon the collet being in the collapsed state; and a toroidal compression spring between the collet and the cylindrical body.

21. A method of releasably securing an appendage having a lip to a main structure comprising the steps of:

movably securing a cylindrical body to the main structure;

moving the cylindrical body relative to the main structure, wherein moving the cylindrical body relative to the main structure comprises the step of moving the cylindrical body with an actuator;

supporting a collet about the cylindrical body; wherein supporting the collet about the cylindrical body comprises the step of providing a toroidal spring between the collet and the cylindrical body;

moving the collet between an expanded state and a collapsed state dependent upon the movement of cylindrical body relative to the main structure;

engaging the appendage lip with a lip receptacle in the collet upon the collet being in the expanded state; and disengaging the appendage lip from the lip receptacle in the collet upon the moving to the collapsed state.

* * * * *